United States Patent
Dewald et al.

(10) Patent No.: US 7,252,391 B2
(45) Date of Patent: *Aug. 7, 2007

(54) METHOD OF PRODUCING AN IMAGE

(75) Inventors: Duane S. Dewald, Dallas, TX (US);
Steven M. Penn, Plano, TX (US);
Michael T. Davis, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/475,655

(22) Filed: Jun. 27, 2006

(65) Prior Publication Data

US 2007/0002285 A1    Jan. 4, 2007

Related U.S. Application Data

(62) Division of application No. 10/910,206, filed on Aug. 3, 2004, now Pat. No. 7,066,605, which is a division of application No. 09/705,467, filed on Nov. 3, 2000, now Pat. No. 6,771,325.

(60) Provisional application No. 60/173,640, filed on Dec. 30, 1999, provisional application No. 60/163,866, filed on Nov. 5, 1999.

(51) Int. Cl.
  *G03B 21/14* (2006.01)
  *G02B 5/22* (2006.01)

(52) U.S. Cl. ......................................... 353/84; 359/885

(58) Field of Classification Search .................. 353/31, 353/84; 348/743, 759, 742; 359/634, 885–889
See application file for complete search history.

(56) References Cited

U.S. PATENT DOCUMENTS

| | | | |
|---|---|---|---|
| 2,933,554 A | 4/1960 | Fredendall | |
| 3,256,385 A | 6/1966 | Miller | |
| 3,685,886 A | 8/1972 | Nakajima et al. | |
| 3,748,035 A | 7/1973 | Mannik | |
| 4,305,099 A | 12/1981 | True et al. | |
| 4,415,931 A | 11/1983 | Dischert | |
| 4,739,396 A | 4/1988 | Hyatt | |
| 4,894,760 A | 1/1990 | Callahan | |
| 5,192,946 A | 3/1993 | Thompson et al. | |
| 5,371,543 A | 12/1994 | Anderson | |
| 5,410,370 A | 4/1995 | Janssen | |
| 5,416,514 A | 5/1995 | Janssen et al. | |
| 5,448,314 A | 9/1995 | Heimbuch et al. | |
| 5,508,738 A | 4/1996 | Janssen et al. | |
| 5,528,318 A | 6/1996 | Janssen | |
| 5,532,763 A | 7/1996 | Janssen et al. | |

(Continued)

FOREIGN PATENT DOCUMENTS

EP    0 749 250 A    12/1996

*Primary Examiner*—Melissa Jan Koval
(74) *Attorney, Agent, or Firm*—Charles A. Brill; Wade James Brady, III; Frederick J. Telecky, Jr.

(57) ABSTRACT

A method of producing an image comprising impinging a beam of light on first region of a dynamic filter. The dynamic filter comprising at least two regions having different light transmission characteristics. A first region of the dynamic filter transmits a first transmitted portion of the beam of light and reflects a first reflected portion of the beam of light. Impinging at least some of the first reflected portion of the beam of light on a second region of the dynamic filter. The second region of the dynamic filter transmitting a second transmitted portion. The first and second transmitted portions are modulated.

11 Claims, 5 Drawing Sheets

U.S. PATENT DOCUMENTS

| | | |
|---|---|---|
| 5,548,347 A | 8/1996 | Melnik et al. |
| 5,592,188 A | 1/1997 | Doherty et al. |
| 5,608,467 A | 3/1997 | Janssen et al. |
| 5,612,753 A | 3/1997 | Poradish et al. |
| 5,650,832 A | 7/1997 | Poradish et al. |
| 5,671,084 A | 9/1997 | Kurtz |
| 5,684,504 A | 11/1997 | Verhulst et al. |
| 5,760,976 A | 6/1998 | DeLaMatyr et al. |
| 5,781,251 A | 7/1998 | Otto |
| 5,845,981 A | 12/1998 | Bradley |
| 5,868,480 A | 2/1999 | Zeinali |
| 5,921,650 A | 7/1999 | Doany et al. |
| 6,005,722 A | 12/1999 | Butterworth et al. |
| 6,097,456 A | 8/2000 | Wang .................. 349/105 |
| 6,155,687 A | 12/2000 | Peterson |
| 6,266,105 B1 | 7/2001 | Gleckman |
| 6,273,571 B1 * | 8/2001 | Sharp et al. ............. 353/122 |
| 6,280,034 B1 * | 8/2001 | Brennesholtz ............. 353/20 |
| 6,361,172 B1 | 3/2002 | Brennesholtz |
| 6,591,022 B2 | 7/2003 | Dewald |
| 6,642,969 B2 | 11/2003 | Tew |
| 6,771,325 B1 | 8/2004 | Dewald et al. |
| 2001/0008470 A1 | 7/2001 | Dewald |
| 2005/0063082 A1 * | 3/2005 | Davis .................. 359/889 |

* cited by examiner

METHOD OF PRODUCING AN IMAGE

CROSS-REFERENCE TO RELATED APPLICATIONS

This application is a Divisional of application Ser. No. 10/910,206, filed 3 Aug. 2004 (now U.S. Pat. No. 7,066,605), which is a Divisional of application Ser. No. 09/705,467, filed 3 Nov. 2000 (now U.S. Pat. No. 6,771,325), which claims the benefit of Provisional Application No. 60/173,640, filed 30 Dec. 1999 and which claims the benefit of Provisional Application No. 60/163,866 filed 5 Nov. 1999.

The following patents and/or commonly assigned patent applications hereby are incorporated herein by reference:

| Patent No. | Filing Date | Issue Date | Title |
| --- | --- | --- | --- |
| 5,192,946 | May 30, 1991 | Mar. 9, 1993 | Digitized Color Video Display System |
| 5,448,314 | Jan. 7, 1994 | Sep. 5, 1995 | Method and Apparatus for Sequential Color Imaging |
| 5,592,188 | Jan. 4, 1995 | Jan. 7, 1997 | Method And System For Accentuating Intense White Display Areas In Sequential DMD Video Systems |
| 5,612,753 | Jan. 27, 1995 | Mar. 18, 1997 | Full-Color Projection Display System Using Two Light Modulators |
| 5,760,976 | Apr. 15, 1997 | Jun. 2, 1998 | Kinematic Integrating Optic Mount |
| 6,642,969 | Dec. 21, 2000 | Nov. 4, 2003 | Color Wheel for a Falling Raster Scan |

FIELD OF THE INVENTION

This invention relates to the field of display systems, particularly to full color display systems using a single light modulator, more particularly to sequential full color display systems using falling raster or scrolling color methods.

BACKGROUND OF THE INVENTION

Viewers evaluate display systems based on many criteria such as image size, resolution, contrast ratio, color purity, and brightness. Image brightness is a particularly important metric in many display markets since the available brightness can limit the image size of a projected image and controls how well the image can be seen in venues having high levels of ambient light.

Projection display designers increase the brightness of a given projection display by increasing the light source used to form the image. Increasing the light source, however, also increases the cost, size, and weight of the display system. Additionally, larger light sources generate additional heat that must be dissipated by the display.

Many other factors affect the brightness of the images produced by the display system. One of the major factors is the number of modulators used to modulate the light used to produce the image. Display systems that use a modulator with a very fast response time, such as the digital micromirror device (DMD™), can use a single modulator to create a full color image. Other display systems use three modulators, such as liquid crystal display (LCD) panels or DMDs, to create a full color image.

Micromirror-based display systems typically operate the micromirrors in a digital, or bistable, manner. Digital operation fully deflects a given micromirror to either a first position or a second position. The illumination optics of the display device illuminate the entire array of micromirror cells. Micromirrors deflected to the first position reflect light along a first path, whereas micromirrors deflected to a second position reflect light along a second path. The projection optics of the display system collects the light from the mirrors in the first position and focus the light onto an image plane. The light reflected by mirrors in the second position is prevented from reaching the image plane. An image pixel associated with a mirror in the first position is brightly illuminated, whereas an image pixel associated with mirrors in the second position are not illuminated.

Pulse width modulation creates the perception of gray scale intensities with a digital micromirror device or other spatial light modulator. When using pulse width modulation, a given micromirror element is rapidly turned on and off in response to a digital intensity word. The duty cycle of the mirror determines the total amount of light contributed to an image pixel. If the pixel is pulsed quickly enough, the human eye will accurately measure the average intensity of the pixel, but will fail to detect the pulsing.

Full-color images also are produced by taking advantage of the relatively slow response time of the human eye. Each frame period is divided into at least three periods. During each period, a primary color image is produced. If the primary color images are produced in rapid succession, the eve will perceive a single full-color-image.

An alternative to the sequential color display system is a three-modulator display system. The three-modulator display system is very similar to the sequential color display system in that they both form full color images by the combining three primary color images. The disadvantage of the three-modulator display system is the cost of the three modulators and the complex optics required both to split the white light beam from the light source into three primary color light beams and to recombine the modulated primary color light beams.

The disadvantage of the single-modulator sequential color display systems is its low image brightness. Because the white light source is time-divided into three primary color light beams, most of the light at any given time is not used. For example, when the blue primary color image is being formed, the green and red output of the white light source are filtered out of the light beam. Thus, a sequential color display system, while generally less expensive than the three-modulator display system, makes very inefficient use of the light produced by the light source.

The lost light not only reduces the brightness of the image produced by the display system, discarding the light creates several problems for the display system. The light filtered out of the light beam generally becomes stray light that the display system must control to prevent from reaching the image plane and degrading the contrast of the displayed image. The off-primary light is generally converted to heat. The heat must be dissipated by using larger fans, which in turn increase the noise produced by the display system and increase the size of the display system.

What is needed is an efficient illumination system that is capable of providing the efficiency of a three-modulator display system while taking advantage of the simplified optics and low cost of a one-modulator display system.

SUMMARY OF THE INVENTION

Objects and advantages will be obvious, and will in part appear hereinafter and will be accomplished by the present invention that provides a method and system for sequential color recapture. One embodiment of the claimed invention provides a display system comprising: a light source for producing a beam of white light, an integrator for homogenizing the beam of white light, a filter for filtering the homogenized beam of white light and separating the homogenized beam of white light into a primary color beam of light traveling along a first path, and a remainder beam of light traveling along a second path, a spatial light modulator on the first path for selectively modulating the light traveling along the first path to form an image, and wherein a portion of the remainder beam of light is incident a second region of the filter and travels along the first path.

A second embodiment of the disclosed invention provides a display system comprising: a light source for producing a beam of white light, an integrator for homogenizing the beam of white light, a filter for filtering the homogenized beam of white light, the filter separating the homogenized beam of white light into a primary color beam of light traveling along a first path, and a remainder beam of light traveling along a second path, a spatial light modulator on the first path for receiving light traveling along the first path and selectively modulating the light traveling along the first path to form an image, and wherein the remainder beam re-enters the integrator and is re-transmitted by the integrator to the filter such that a portion of the remainder beam of light is incident a second region of the filter and travels along the first path.

A third embodiment of the disclosed invention provides a method of producing an image. The method comprises the steps of: providing a beam of white light, impinging the beam of white light on a first region of a dynamic filter, the first region of the dynamic filter transmitting a first primary portion and rejecting a remainder of the beam of light, modulating the first primary portion, impinging a portion of the remainder of the beam of light on a second region of the dynamic filter, the second region of the dynamic filter transmitting a second primary portion of the remainder of the beam of light, modulating the second primary portion of the beam of light, and focusing the modulated first and second primary portions of the beam of light on an image plane.

The disclosed invention provides the technical advantage of much higher illumination efficiency. Since all color components of the beam of light are used at all times, the disclosed system and method achieve three modulator panel system efficiencies using only a single modulator panel. The higher efficiency enables the use of lower cost light sources that have longer operational lives and produce less heat. The apparatus required to implement the disclosed invention is much less costly than the optics and modulator panels required to implement a three panel display solution. Because less heat is generated, the overall display system volume will decrease since there is a reduced need for cooling fans and air ducts.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new optical system and method have been developed that dramatically improve the optical efficiency of sequential color display systems. The system uses a sequential color concept called falling raster or scrolling color in which the illumination beam laterally changes color. The light rejected by the sequential filters is recycled, that is collected and presented to the filter again, increasing the efficiency of the system. Since more than one color is being displayed at a given time, light rejected by one filter segment can pass through another filter segment if it is successfully routed to another proper filter segment.

Figure 1:
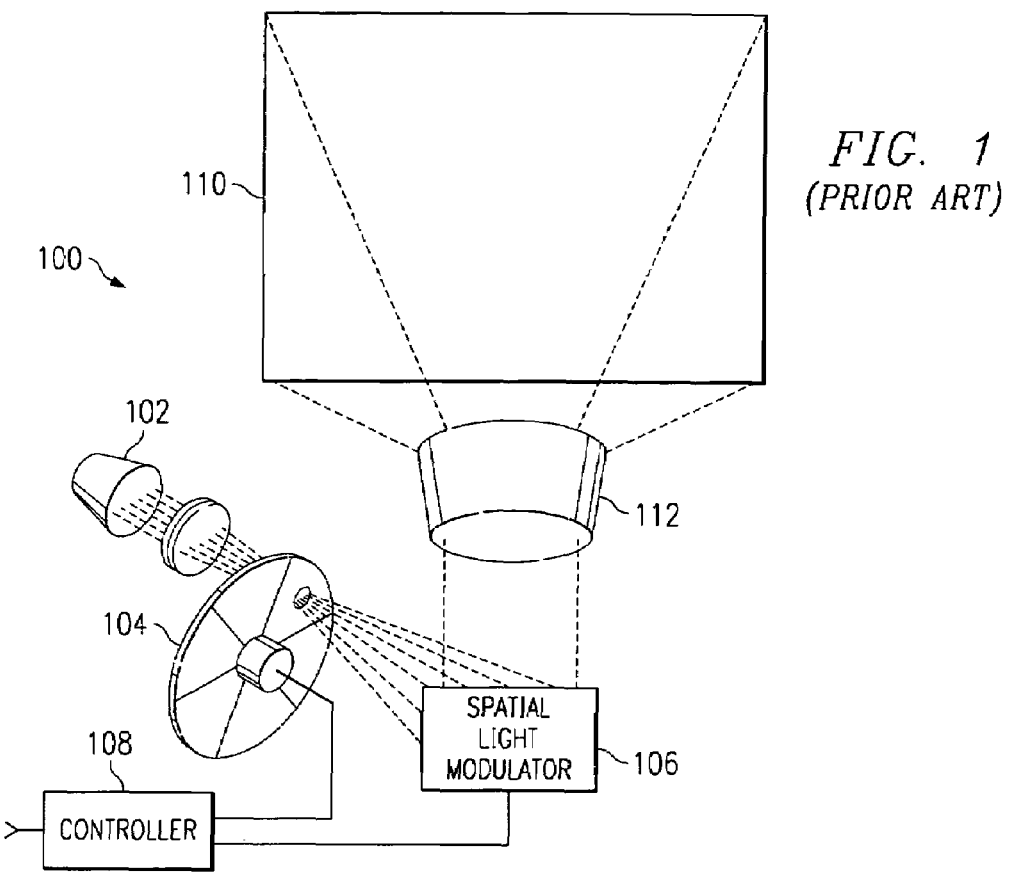
FIG. 1 is a perspective view of a sequential color display system of the prior art.

FIG. 1 is a perspective view of a sequential color display system 100. In the display system 100 of FIG. 1, light from source 102 is focused onto a spinning color wheel 104. The spinning color wheel 104 creates of beam of light that changes from one primary color to the next in rapid sequence. The primary colored beam of light impinges a spatial light modulator 106, in this case a DMD.

A controller 108 receives a video signal and sends image data to the spatial light modulator 106 in synchronization with the color wheel 104. Image data representing the red portions of the image is sent during the period in which the red color filter is passing through the beam of light. The modulated red beam of light is focused onto an image plane 110 by projection lens 112 to form a red image. The process is repeated as the green and blue filters pass through the path of the light beam. The eye of the viewer integrates the three primary color images giving the perception of a single full-color image.

Figure 2:
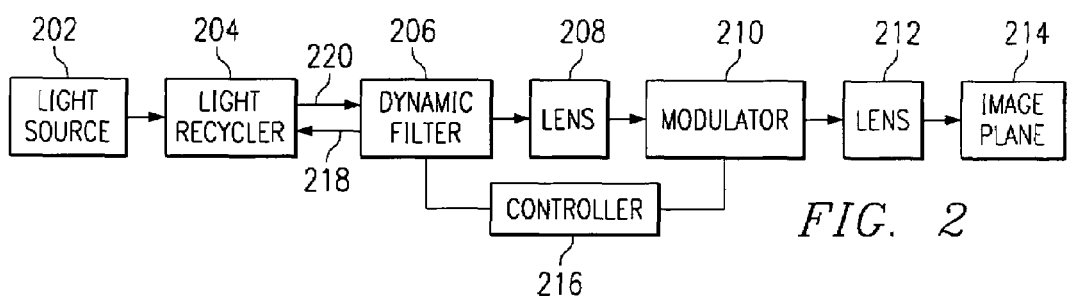
FIG. 2 is a block diagram of a scrolling color display system capable of recycling the light rejected by the color filters according to one embodiment of the present invention.

FIG. 2 is a block diagram of a sequential color recycling system according to one embodiment of the present invention. In FIG. 2, light source 202 provides a beam of light to a light recycler 204. The light recycler 204, which sometimes includes the lamp housing or reflector, homogenizes the beam of light and passes it to a dynamic filter 206. The dynamic filter is typically a set of moving dichroic filters, such as a color wheel. Each filter in the dynamic filter has a passband in which light of a range of wavelengths is selected, in this case transmitted, while out of band light is rejected, in this case reflected.

Light transmitted by the dynamic filter 206 is focused by lens 208 onto a spatial light modulator 210. The spatial light modulator 210 modulates the light to form an image beaming beam of light that is focused by lens 212 onto an image plane 214. As in FIG. 1, controller 216 receives image data and sends primary color image data to the modulator 210 in synchronization with the dynamic filter 206.

As described above, the dynamic filter transmits light in its passband and rejects light outside its passband. FIG. 2 shows the rejection path leading back to the light recycler 204. The light recycler 204 receives the rejected light and reflects it back to the dynamic filter 206. If the recycled light strikes a filter having a different passband it may be transmitted to lens 208. Rejected portions of the recycled light are again recycled by the light recycler 204 and presented to the dynamic filter 206. This process continues until the light is either absorbed by the light recycler 204, accepted by the dynamic filter 206, or escapes the light recycler 204.

One key element of the system shown in FIG. 2 is the dynamic filter 206. The dynamic filter must provide one or more segments of each primary color filter to the light beam at all times in order for all of the recycled light to be able to find a filter through which it may pass. Although the filters for each color need not be the same size, if the recycling operation is efficient there is no advantage to unequal sized filters.

Figure 3:
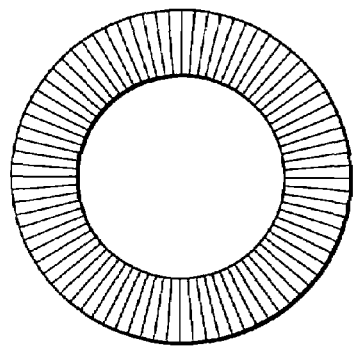
FIG. 3 is a plan view of one embodiment of a color wheel suitable for use with the disclosed recycling scrolling color illumination system.
Figure 4:
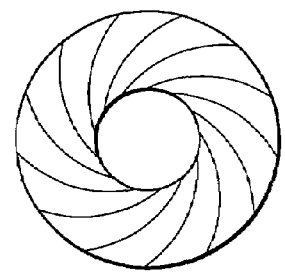
FIG. 4 is a plan view of a second embodiment of a color wheel suitable for use with the disclosed recycling scrolling color illumination system.
Figure 5:
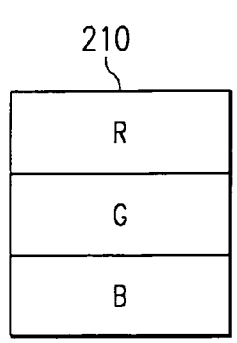
FIG. 5 is a plan view of a spatial light modulator illuminated by a light beam filtered to result in three lateral primary color segments.

FIGS. 3 and 4 are plan views of two embodiments of multi-segment color wheels. Both of the color wheels shown in FIGS. 3 and 4 have a large number of small segments. Each segment transmits one of the primary colors and rejects the other two primary colors. Light from the color wheel is imaged onto the spatial light modulator such that a separate portion of the spatial light modulator is illuminated by each filter. FIG. 5 shows a spatial light modulator 210 onto which light from a three-color dynamic filter 206 is imaged.

Since the modulator is typically arranged in horizontal rows of modulator cells that receive many of the same operating signals and bias voltages, the operation of the modulator is much more efficient when the primary color segments have horizontal boundaries and move vertically from row to row. The modulator elements can also be arranged in vertical groups of columns, in which case the primary color segments should have vertical boundaries and move horizontally from column to column.

Color wheels like the one shown in FIG. 3 tend to produce pie shaped primary color segments with tilted boundaries between the segments. As the radius of the color wheel increases, the angle between the segments decreases. Large color wheels are undesirable since they require a larger system package, a larger motor to turn them, and their larger inertia makes it more difficult to change the speed of the color wheel to align the color wheel to the video signal.

Figure 11:
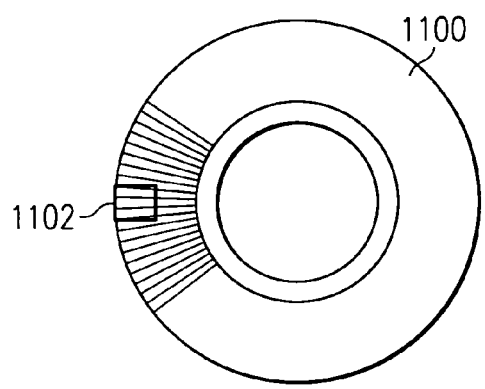
FIG. 11 is a plan view of the color wheel of FIG. 3 showing the relationship between color wheel and a cross section of the optical path of the display system.

FIG. 11 is a plan view of the color wheel 1100 of FIG. 3 showing the relationship between color wheel and a cross section of the optical path 1102 of the display system. The optical path 1102 is the area illuminated by the light leaving the integrator rod 810 shown in FIG. 8. The integrator rod is typically positioned very close to the color wheel to ensure that light reflected by the color wheel is recaptured by the integrating rod. The optical path cross section 1102 shown in FIG. 11 is also illustrative of the alignment between the color wheel 1100 and the modulator, since the portion of the color wheel 1100 passing through the cross section of the optical path 1102 is imaged onto the modulator. The color wheel of FIG. 11 is 70 mm in diameter and has 40 sets of primary filters, typically red, green, and blue, for a total of 120 filter segments. Rotating the wheel at only 90 rpm supports a 60 hz frame rate, though a higher rate may be required to reduce temporal artifacts.

One advantage of the disclosed illumination system is the ability to spin the color wheel at a very low rate. Slow color wheels are safer since pieces of a broken color wheel—which is often glass—that is spinning slowly have much less momentum that pieces of a rapidly spinning color wheel. The slower color wheel also generates much less noise, which is a valuable trait in most display system applications. Slower color wheels also enable the use of smaller color wheel motors and do not need to be balanced as accurately as faster color wheels.

The spiral color wheel of FIG. 4 is used to reduce the size of the color wheel while maintaining good alignment between the modulator and the illuminated segments of the color wheel. The spiral color wheel shown in FIG. 4 has color filters whose boundaries form the "spiral of Archimedes." The spiral of Archimedes is defined by:

$$r = a\theta$$

where r is the radius or distance of said interface from said center, a is a constant, and $\theta$ defines an arc between said interface and a reference. A different reference is used for each boundary between two filters.

Figure 15:
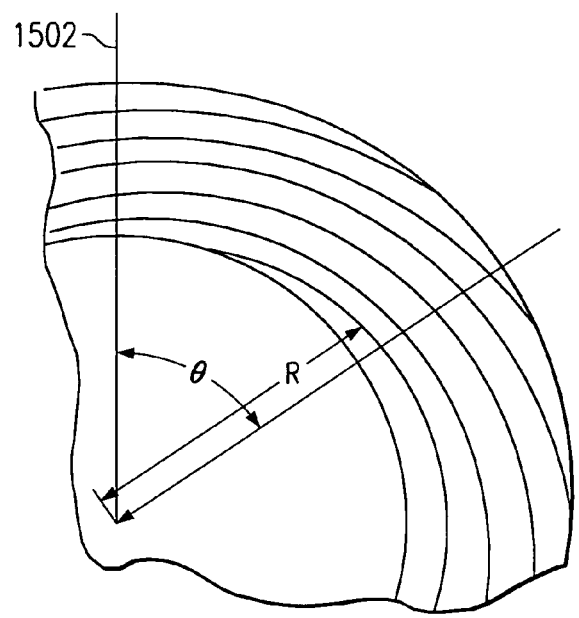
FIG. 15 is a plan view of a portion of the color wheel of FIG. 4 detailing the curvature of the filter segments.

FIG. 15 shows the relationship between the reference 1502, $\theta$, and the radius r. The result of using the spiral of Archimedes is that each boundary approximates an inclined plane sliding past the light valve. The boundary is not straight, so it cannot be parallel to the rows of modulator elements. The boundary does, however, form a very shallow curve that is tangential to the rows of the modulator elements and the boundary maintains the same curve and speed across the entire face of the modulator, even when using a small filter wheel.

The spirals are designed and aligned to the spatial light modulator such that the tangent of the boundaries between adjacent segments is approximately horizontal to the rows of spatial light modulator. As the spiral wheel turns, the portion of the spiral passing through the beam of light shifts along the spiral maintaining good alignment between the segments and the modulator.

Figure 12:
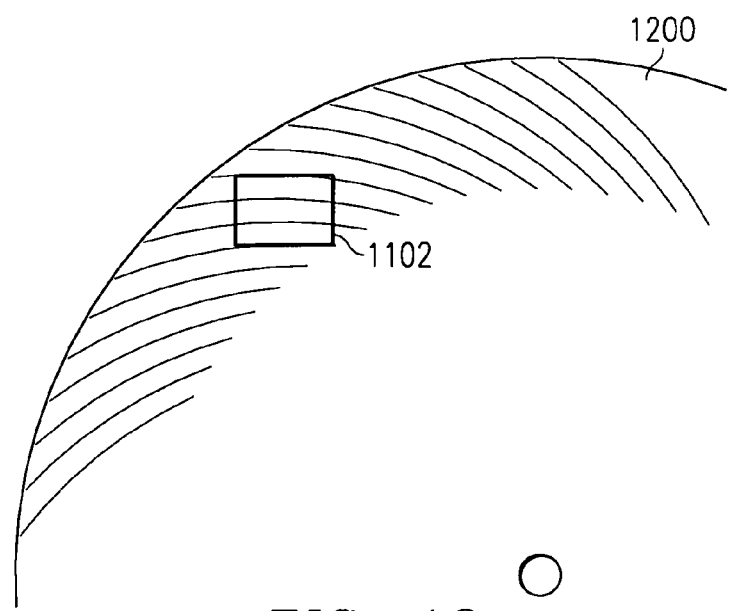
FIG. 12 is a plan view of a portion of a spiral color wheel similar to the color wheel shown in FIG. 4 showing the alignment of the spiral color wheel with the cross section of the display system optical path.

FIG. 12 is a plan view of a portion of a spiral color wheel 1200 similar to the color wheel shown in FIG. 4 showing the alignment of the spiral color wheel with the cross section of the display system optical path 1102. The filter segments of the spiral color wheels in FIGS. 4 and 12 move horizontally and vertically with respect to the optical path cross section 1102 as the wheel rotates. This improves the alignment between the filter segments and the horizontal rows of modulator elements across the entire modulator array. The color wheel of FIG. 12 has 24 sets of primary color filters, for a total of 72 filter segments. Assuming 10 sets of filters are required to form each frame, rotating the wheel at 25 Hz supports a 60 Hz frame rate.

Figure 13:
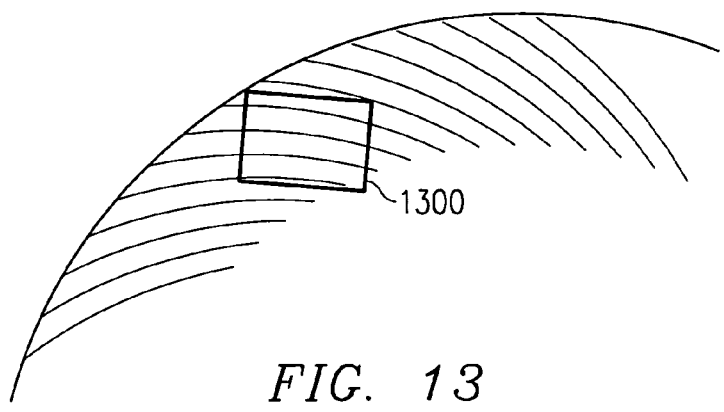
FIG. 13 shows the addition of an optional white filter segment to each set of primary color filters in the color wheel of FIG. 13.

FIG. 13 shows the addition of an optional white filter segment 1300 to each set of primary color filters. The use of a white segment increases the overall system brightness in sequential color systems, but at the cost of decreased image saturation. Because the recycling operation is not 100% efficient—for reasons described below—the use of a white segment increases the efficiency of the illumination system by 25%.

Although current DMD designs group the modulator elements in reset groups comprised of a number of complete rows, future designs can group the elements in groups comprised of a number of complete columns of elements. Changing the grouping of the elements would require changing the orientation of the light valve outline 1102 shown in FIG. 12, and would provide a better match between the boundaries of the filter segments and the reset groups. As mentioned above, the spiral of Archimedes color segments provide a curved boundary between segments. This curve prevents perfect alignment between the reset groups and the filter boundaries. The longer the segment of the boundary illuminated, the greater the effect of the curvature on the alignment. Turning the modulator 90° from the orientation shown in FIG. 12 uses a shorter portion of the boundary and allows the use of larger filter segments, especially when used with widescreen formats such as the 16:9 HDTV format.

Figure 6:
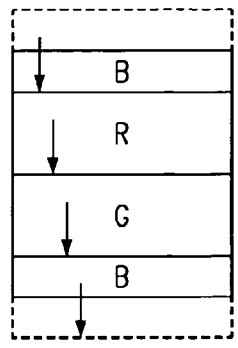
FIG. 6 is a plan view of the spatial light modulator of FIG. 5 as the three primary color segments shift across the spatial light modulator.
Figure 7:
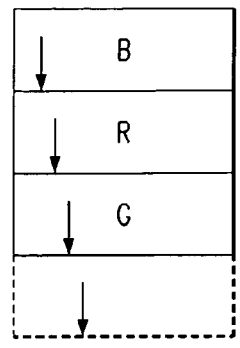
FIG. 7 is a plan view of the spatial light modulator of FIG. 5 as the three primary color segments shift further across the spatial light modulator.

As the color wheel turns, the three primary color segments imaged onto the spatial light modulator move across the face of the spatial light modulator. FIG. 6 shows the three primary color segments of FIG. 5 shifted lower on the face of the spatial light modulator 210. As seen in FIG. 6, as soon as one primary color segment starts to leave the face of the spatial light modulator, another segment of the same color starts to enter. FIG. 7 shows the three primary color segments of FIG. 5 after they have shifted the width of one segment.

Since each color appears on a different region of the modulator at any given time, the image data provided to the modulator is a mixture of data for all three primary colors. For example, while one region of the modulator is operated using red data, other regions of the modulator are operated using green and blue data. Due to limitations imposed by the addressing circuitry and the ability to precisely control the sweep of the boundaries between the regions across the spatial light modulator, the rows of the spatial light modulator are typically divided into several groups and each group receives data for a single primary color. During periods in which the boundary between two regions sweeps across a given group of rows, the group is either turned of or used to create a white component using methods referred to as spoke light recapturing.

Figure 8:
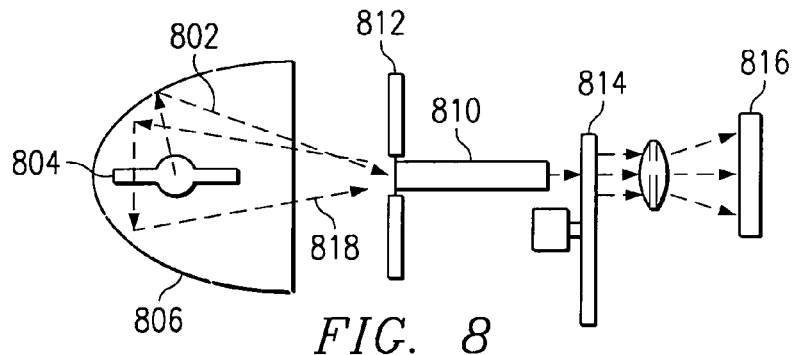
FIG. 8 is a side view of a recycling scrolling color illumination system according to one embodiment of the present invention.

FIG. 8 is a side view on one embodiment of a sequential color recycling display system. In FIG. 8, light 802 from an arc lamp 804 is reflected by a reflector 806 and enters an integrating rod 810 through an aperture in a reflective aperture plate 812. Various integrating rods 810 are used. For example, the integrating rod 810 can be a hollow structure with a reflective internal surface or a solid rod that used total internal reflection to retain the light passing through it. The light entering the integrating rod 810 reflects on the surface of the integrating rod several times until the beam traveling through the integrating rod 810 assumes a uniform cross-section.

Light exiting the integrating rod 810 impinges on the dynamic filter, shown in FIG. 8 as a color wheel 814. Some light impinging on the color wheel 814 passes through each of the three or more segments illuminated by the beam. Each segment transmits some of the incident light and reflects the remainder. Light transmitted by the color wheel 814 is focused onto the spatial light modulator 816.

The light rejected by the color wheel 814 travels back through the integrating rod 810. In the embodiment shown in FIG. 8, the light is allowed to exit the integrating rod and is reflected by the lamp reflector 806 before re-entering the integrating rod 810. Referring back to FIG. 2, the light recycler 204 is comprised of both the integrating rod 810 and the reflector 806 of FIG. 8. The recycled light 818 is once again homogenized by the integrating rod 810 before impinging on the dynamic filter 814. The recycled light 818 in FIG. 8 has a ⅓ chance of striking the same filter a second time and once again being rejected, a ⅓ chance of striking an second filter and being rejected, and a ⅓ chance of striking a second filter and being transmitted.

The recycling process continues until the light either reaches a portion of the dynamic filter through which it can pass, or until the light is absorbed by or escapes the light recycler. The light being recycled can be absorbed by the surface coatings of the reflector 806 as well as being absorbed when it strikes an electrode of the arc lamp.

Figure 9:
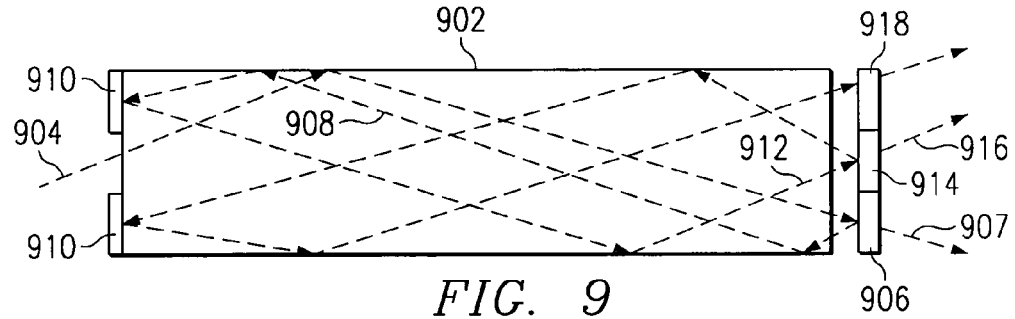
FIG. 9 is a side view of one embodiment of an integrating rod for use with the disclosed recycling scrolling color illumination system.
Figure 14:
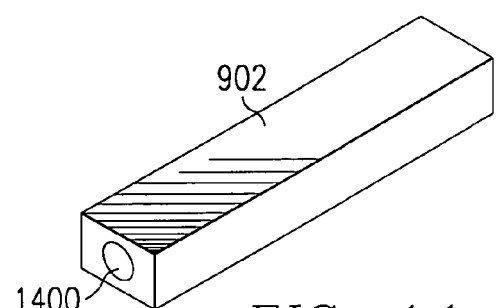
FIG. 14 is a perspective view of one embodiment of an integrator rod designed to recycle light passing through it.

FIG. 14 is a perspective view of one embodiment of an integrator rod 902 designed to recycle light passing through it. FIG. 9 is a cross section of an integrator rod 902 from FIG. 14. Light 904 from a light source enters the rod through an aperture in a mirrored entrance end of the rod 902. The aperture is approximately ⅓ of the area of the rod end. The small aperture is especially suitable when combined with low power lamp sources whose arc is typically smaller than the high powered sources. Since the use of the integrator rod 902 in a scrolling color recycling display system greatly increases the overall system efficiency, a lower-power light source is needed to maintain a given system brightness level.

The integrating rod 902 is typically a solid glass bar, other materials are available. For example, some integrating rods are hollow structures with internally mirrored surfaces. The integrating rod typically has the same cross section aspect ratio as the modulator used by the display system.

The mirrored end surface of the integrating rod 902 reflects light striking the integrating rod outside the aperture 1400 shown in FIG. 14. This light is reflected back to the lamp and reflector and has a high probability of returning to the integrator at the proper position and angle to be transmitted through the aperture 1400. The reflective aperture shown in FIG. 14 has been demonstrated to provide an 8 to 15 percent brightness gain.

The light entering the rod is reflected several times as it travels through the rod. As the light exits the exit end of the rod 902, it strikes a first segment 906 of a dynamic filter which allows a first band 907 of the light to pass through. The remainder of the light 908 is reflected by the first segment 906 of the dynamic filter and travels through the integrator rod in the reverse direction. The remainder of the light 908 is reflected by a mirror 910 deposited on the entrance end of the integrating rod 902 and again travels through the rod 902 in the first direction. The recycled light 912 eventually impinges on a second segment 914 of the dynamic filter allowing a second band 916 to pass through. The remainder of the light is recycled again until it eventually strikes the third segment 918 of the dynamic filter and the third band passes through.

Using the integrator rod 902 of FIGS. 9 and 14, with an entrance aperture 1400 area of ⅓ the area of the end of the rod, ⅓ of the light reflected by the first segment 906 exits the integrating rod and returns to the lamp and reflector. Because this light is traveling toward the lamp from a point very near the second focus of the reflector, it has a high probability of passing near the arc and being focused by the reflector back into the input aperture 1400.

The remaining ⅔ of the light reflected by the first segment 906—the portion reflected by the mirrored end 910 of the integrator rod—has a ⅔ chance of striking either the second 914 or third 918 filter segments. Since the light only contains two primary components, the third primary component having already passed through the first filter segment, 50% of the light striking the second and third filter segments is accepted by the filter segments and passes through the color wheel. The remaining portion is again recycled and presented to the color wheel. The light gain achieved by the integrating rod having a reflective input aperture is:

$$\text{GAIN} = \sum_{n=0}^{\infty} \left[ \left(1 - \frac{A_1}{A_{INT}}\right)\left(1 - \frac{A_2}{A_{INT}}\right)(R_1)(R_2) \right]^n$$

where:
$A_1$=Area of a particular color segment projected onto the integrator end surface;
$A_{INT}$=Area of integrator (assuming equal area on each end);
$A_2$=Area of input aperture; and
$R_1/R_2$=Reflectance of each end including loss by bevels, scattering, and light leakage.

Assuming no reflection losses, and setting $A_1/A_{INT}$ and $A_2/A_{INT}$ equal to ⅓, the theoretical efficiency of such a system would be:

Efficiency (⅓)[1+(⅔)$^2$+(⅔)$^4$+(⅔)$^6$+ . . . ]≈[1.8]

In other words, the system has the potential to be up to 1.8× more efficient than a field-sequential illumination system given the lamp etendue is decreased sufficiently. Assuming a large loss per reflection of 5%, the efficiency series converges to a 1.65× efficiency gain. The efficiency calculations above assume the light returning to the lamp and reflector is lost. As described above, recycled light passing through the input aperture 1400 returns to the lamp and reflector assembly and has a good chance of returning to the input aperture. Modeling shows that the light returning to the input aperture from the lamp and reflector assembly increases the efficiency of the illumination system by up to 20% above that described above. In practice, however, there appears to be much less light recycled through the lamp and reflector as it is difficult to measure much light recycling through the lamp and reflector. Nevertheless, it is possible to eliminate the mirrored end of the integrating rod and allow all of the recycled light to return to the reflector. The reflector is therefore considered part of the light recycler 204 of FIG. 2.

Figure 17:
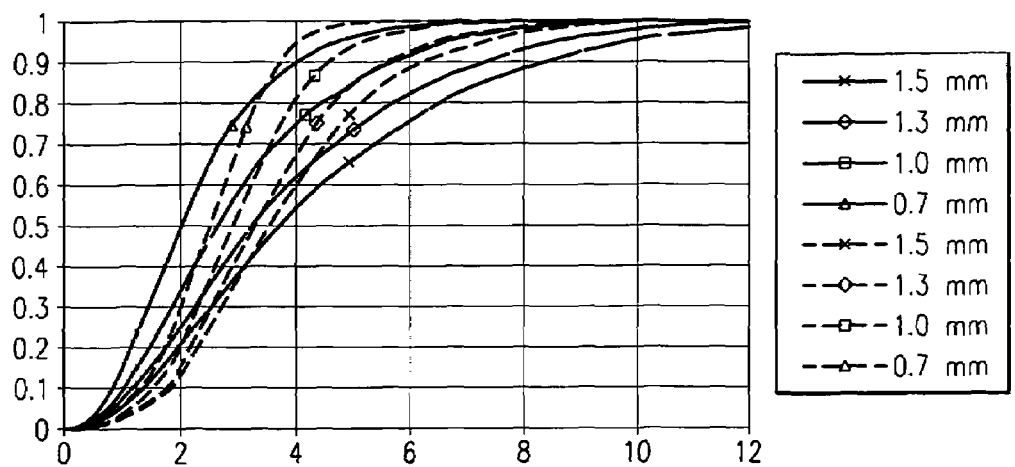
FIG. 17 is a plot of the collection efficiency for various arc sizes over a range of aperture sizes.
Figure 18:
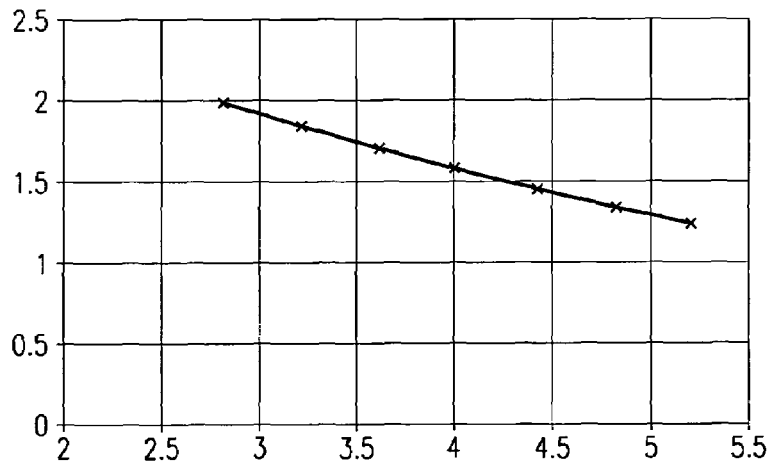
FIG. 18 is a plot of the modeled recycling efficiency of an integrator rod having a mirrored input face for various input aperture diameters.
Figure 19:
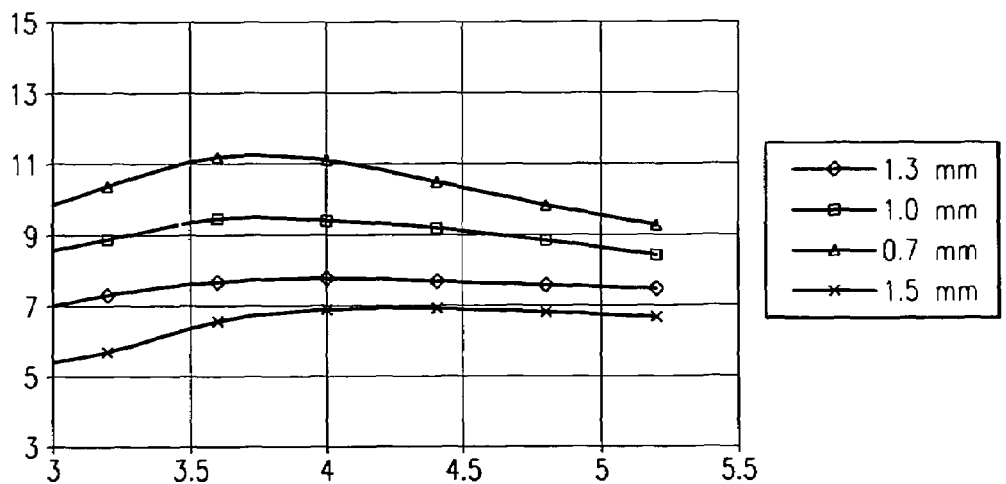
FIG. 19 is a plot of the modeled overall reflector and integrator recycling efficiency for a range of mirrored integrating rod aperture sizes.

The size of the aperture in the mirrored end of the integrating rod has a large effect on the overall efficiency of the system. In general, the larger the aperture the more efficient the light collection system, but the less efficient the recycling. Likewise, a smaller aperture increases the recycling efficiency, but reduces the amount of light able to enter the integrating rod. FIGS. 17-19 illustrate the effects of arc size and aperture size on the efficiency of the light collection system.

FIG. 17 is a series of plots showing the modeled collection efficiency versus collection aperture diameter for various lamp arc sizes and reflector designs. In FIG. 17, the aperture diameter in millimeters is represented by the x-axis, while the y-axis represents the f/1 collection fraction. The arc sizes range from 0.7 mm to 1.5 mm. Traces using a solid line illustrate the collection efficiency of elliptical collectors. Traces using broken lines illustrate the collection efficiency of parabolic reflectors.

FIG. 18 is a plot of the recycling gain realized by a 6.4 mm×4.8 mm integrator rod over a range of mirrored input aperture sizes. In FIG. 18, the x-axis represents the input aperture diameter in millimeters, while the y-axis represents the recycling gain. FIG. 18 assumes a 7% reflection loss for each pass through the integrating rod. FIG. 19 is a plot combining the data from FIGS. 17 and 18 to show the overall illumination efficiency over a range of input aperture sizes for several lamp arc sizes. As shown in FIG. 19, which plots the illumination efficiency in Lumens/watt on the y-axis and the input aperture on the x-axis, the larger the lamp arc size the larger the optimum input aperture of the integrating rod.

Adding the efficiency gains achieved by using a white segment, the overall efficiency of a display projector is increased by up to 120% (2.2×). This efficiency gain enables the use of a one-modulator display system in applications that previously required a three-modulator display. Alternatively, a much lower power lamp is used to provide an equivalent brightness to systems that do not use scrolling color recycling. The increase in efficiency has a direct effect on the overall heat load on the projector since the unused light is recycled instead of being absorbed as heat.

Figure 10:
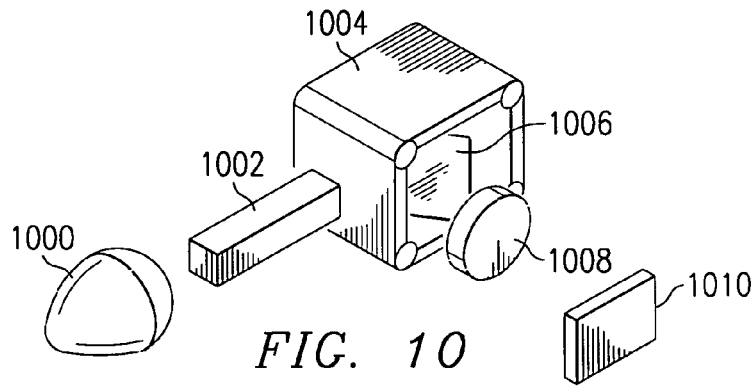
FIG. 10 is a side view of a recycling scrolling color illumination system according to an embodiment of the present invention using a color filter belt.

Although the embodiments described thus far have used either pie-shaped or spiral-shaped segments of a color wheel, many other embodiments are possible. For example, various filter drums, belts, or other arrangements are equally applicable. FIG. 10 is a perspective view of one embodiment of an illumination path using a filter belt. In FIG. 10, a light source 1000 provides a white light beam to an integrating rod 1002. The integrating rod homogenizes the beam of white light and provides the beam of light to a rotating filter belt 1004. Light rejected by the filter belt 1004 returns through the integrating rod to be recycled. Light passing through the filter belt is reflected by a mirror 1006 and focused onto the spatial light modulator 1010 by a lens 1008. As with the previous embodiments, careful optical design is necessary to recapture and recycle the rejected illumination. For example, the dynamic filter is typically located very close to the integrating rod to ensure most of the light rejected by the dynamic filter reenters the integrating rod.

The greatest efficiency gains are achieved when implementing sequential color recycling in a one-panel (single LCD, DMD, or other modulator) display system. The sequential color recycling methods and apparatus described above allow a single-panel system to achieve much higher efficiencies that were previously possible. Application of the methods and systems taught herein, however, is not limited to single-panel display systems. The same techniques are applicable to two and three panel displays, but typically result in a more expensive display system.

Figure 16:
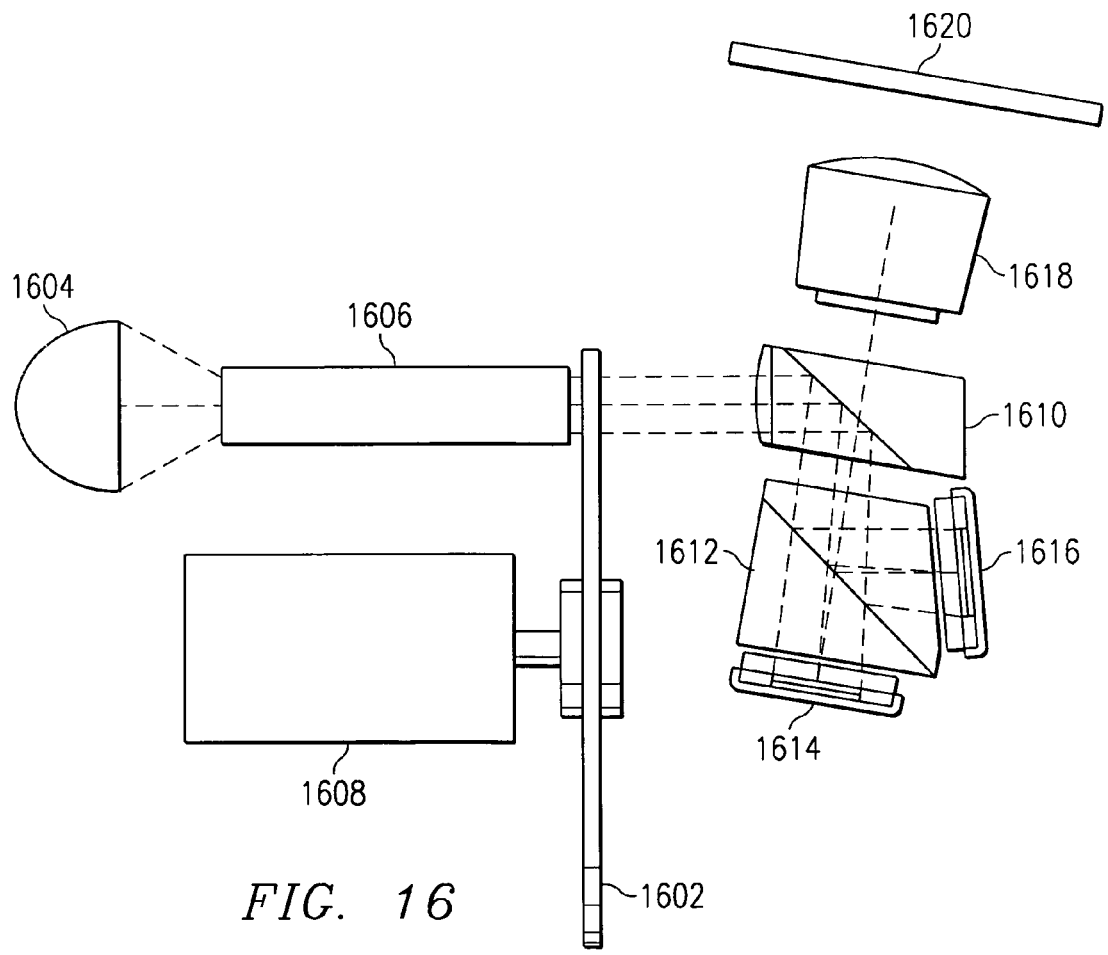
FIG. 16 is a plan view of a two-modulator scrolling color recapture display system according to one embodiment of the present invention.

U.S. Pat. No. 5,612,753 describes a two panels system that uses one panel to sequentially produce two primary color images while the second panel produces a third primary color image. The concepts of scrolling color recapture are applied to the two panel display system shown in FIG. 16. In FIG. 16, a spiral color wheel 1602 filters light from source 1604 that has been homogenized by the integrating rod 1606. The spiral color wheel 1602 contains many pairs of color filters and is spun by motor 1608. Each filter allows two primary colors to pass, and rejects one primary color. The filters are selected so that both pass one of the primary colors. One of the other primary colors is passed by one of the filters, and the other primary color is passed by the other filter. For example, a first filter passes magenta light—light comprised of the red and blue primaries, while the other filter passes yellow light—light comprised of the red and green primaries. The filtered light enters a TIR prism assembly 1610 that reflects the light to a color splitting prism assembly 1612. A dichroic filter at the interface between the two prisms in the color splitting prism assembly 1612 separates the primary color passed by both filters from the other two primaries. For example, the red light passes through the dichroic filter and is modulated by DMD 1614. The other two primaries are reflected by the dichroic filter and modulated by DMD 1616.

The filtering results in modulator 1614 is always completely illuminated by red light, while blue and green light scroll across modulator 1616. The light rejected by the filter segments of the color wheel consists of the blue and green components and is recycled.

The light modulated by the spatial light modulators retraces its path through the color prisms. Because the DMDs changed the angle of the modulated light, the modulated light passes through the interface between the TIR prisms without reflecting at the interface. The modulated light is focused by projection lens 1618 onto image plane 1620 to form an image.

The dynamic filter thus far has been described as a moving set of dichroic filters. Other types and arrangements of filters are also useful. For example, a set of stationary filters in combination with an apparatus to sweep the primary color beams across the surface of the modulator is another form of dynamic filter. Likewise, solid-state color switches could be used in other embodiments.

Several methods of adjusting the white point and color gamut of the system described are available. First, the image data used to create each primary color can be scaled to reduce the maximum intensity of certain primary components. Alternatively, variable filter densities are used to reduce the brightness of some of the primary light components prior to modulation. Additionally, because the recycling system is not 100% efficient, adjusting the relative size of the color filters alters the white point of the display system by increasing the odds certain primary components of the light will be accepted by the filters. Increasing the odds of a given primary component being accepted reduces the loss that would otherwise be experienced by each additional reflection and the loss that would occur as some the light escapes to the reflector and does not return to the integrating rod.

As described above, color wheels tend to produce pie-shaped color segments that move across the modulator. The angle of the borders between the segments changes as the light from the color wheel moves across the face of the modulator. The spiral of Archimedes design helps to keep the angle of the border constant as the color segments move across the modulator, but produces a curved border and is difficult to build. Light that changes color, or is a mixture of primary colors, is difficult to use. The mixed light can be used to create secondary colors or white, boosting the brightness of the display system, but sacrificing color purity. Alternatively, the spoke light is discarded by turning off the modulator elements during the period in which the light received by the elements is changing colors.

Thus, although there has been disclosed to this point a particular embodiment for a method and system for sequential color recapture, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of producing an image, said method comprising:
impinging a beam of light on first region of a dynamic filter comprising at least two regions having different light transmission characteristics, a first region of said dynamic filter transmitting a first transmitted portion of said beam of light and reflecting a first reflected portion of said beam of light;
impinging at least some of said first reflected portion of said beam of light on a second region of said dynamic filter, said second region of said dynamic filter transmitting a second transmitted portion;
modulating said first and second transmitted portions; and
said beam of light impinging at least two different regions of said dynamic filter at all times while producing said image.

2. The method of claim 1, said step of impinging said beam of light on a first region comprising the step of impinging said beam of light on a first region of a rotating color filter.

3. The method of claim 1, said step of impinging at least some of said first reflected portion comprising the step of impinging at least some of said first reflected portion on a second region of a rotating color filter.

4. The method of claim 1, said step of impinging a portion of said remainder of said beam of light on a second region of said dynamic filter further comprising reflecting a second reflected portion, and further comprising the steps of:
impinging said second reflected portion on a third region of said dynamic filter, said third region of said dynamic filter transmitting a third transmitted portion of said beam of light.

5. The method of claim 1, comprising:
transmitting said first transmitted portion to a spatial light modulator.

6. The method of claim 1, comprising:

transmitting said second transmitted portion to a spatial light modulator.

7. The method of claim 1, comprising:

transmitting said third transmitted portion to a spatial light modulator.

8. The method of claim 1, comprising:

transmitting said first, second, and third transmitted portions to a spatial light modulator.

9. The method of claim 1, wherein modulating said first and second transmitted portions comprises modulating said first and second transmitted portions with a spatial light modulator.

10. The method of claim 1, wherein modulating said first and second transmitted portions comprises modulating said first and second transmitted portions with a common spatial light modulator.

11. The method of claim 1, comprising:

focusing said modulated portions on an image plane.

* * * * *